United States Patent [19]

Godfrey et al.

[11] 4,380,765
[45] Apr. 19, 1983

[54] RADAR SYSTEMS

[75] Inventors: Michael F. Godfrey, St. Albans; David Lynam, Bushey, both of England

[73] Assignee: The Marconi Company, Ltd., Chelmsford, England

[21] Appl. No.: 903,702

[22] Filed: May 3, 1978

[30] Foreign Application Priority Data

May 4, 1977 [GB] United Kingdom .............. 18751/77

[51] Int. Cl.³ ............................................ G01S 13/44
[52] U.S. Cl. ................................................ 343/16 M
[58] Field of Search ...................................... 343/16 M

[56] References Cited

U.S. PATENT DOCUMENTS 4,160,975 7/1979 Steudel ............................. 343/16 M Primary Examiner—T. H. Tubbesing
Attorney, Agent, or Firm—Kirschstein, Kirschstein, Ottinger & Cobrin

[57] ABSTRACT

A target tracking airborne active radar system in which a reduction in transmitter power is achieved by using individual amplifiers in the aerial quadrant channels. The amplifiers provide gain on transmission and negligible loss on reception and are realized by Impatt diode/hybrid junction modules.

9 Claims, 5 Drawing Figures

RADAR SYSTEMS

This invention relates to active radar systems. It is particularly concerned with airborne radar systems in which signals from a transmitter carried by a missile are used to illuminate a target and echo signals received from the target are processed in a receiver to enable the missile to track and home on the target.

When such radar homing systems utilize a common aerial system to transmit the signals which illuminate the target and to receive echo signals from the target the well known difficulty arises that the receiver needs to be isolated from the transmitter while it is transmitting if damage to the receiver or loss of transmitted power is to be avoided.

An object of this invention is to provide a radar system, particularly for use in an airborne system, in which this difficulty is alleviated.

According to the present invention, a radar system comprises a multi-channel transmit/receive aerial system, comparator means for providing sum and difference channels for target detection, a low power radar transmitter, means for coupling the radar transmitter into the sum channel, a radar receiver, means for coupling the sum and difference channels to the radar receiver, amplifying means individual to each of the aerial channels, the amplifying means being controllable to provide high gain in the transmitting direction and negligible loss in the receiving direction, and control means for switching the amplifying means, the means for coupling the transmitter, and the means for coupling the receiver, in accordance with pulsed operation of the radar system.

The amplifying means preferably comprises a hybrid junction having two input/output ports and two further ports terminated by respective negative resistance devices, the negative resistance devices being controllable to provide amplification between the input/output ports in a first bias condition and negligible loss between the input/output ports in a second bias condition.

The negative resistance devices are preferably IMPATT diodes forward and reverse biased to provide said first and second bias conditions respectively.

The amplifying means may comprise a hybrid junction having two input/output ports and two further ports, each of the further ports being terminated by a parallel combination comprising a negative resistance device controllable to provide amplification between the input/output ports in a first bias condition, the parallel combination also comprising a controllable resistance device having a first bias condition in which it constitutes an open circuit and a second bias condition in which it constitutes a short circuit and causes reflection of power through the hybrid junction from one of the input/output ports to the other with negligible loss, the first and second bias conditions corresponding to radar transmission and reception respectively. Each negative resistance device may be an IMPATT diode and each said controllable resistance device may be a PIN diode.

The means for coupling the radar transmitter into the sum channel may comprise a solid state microwave switch whereby the sum channel is connected to the transmitter during radar transmission and to the receiver during radar reception.

Alternatively, the means for coupling the radar transmitter into the sum channel may comprise a microwave circulator whereby the transmitter is coupled to the sum channel only and the sum channel is coupled to the receiver only.

The means for coupling the sum and difference channels to the radar receiver may comprise solid state microwave switches.

The invention will now be described, by way of example, with reference to the accompanying drawings in which.

Figure 1:
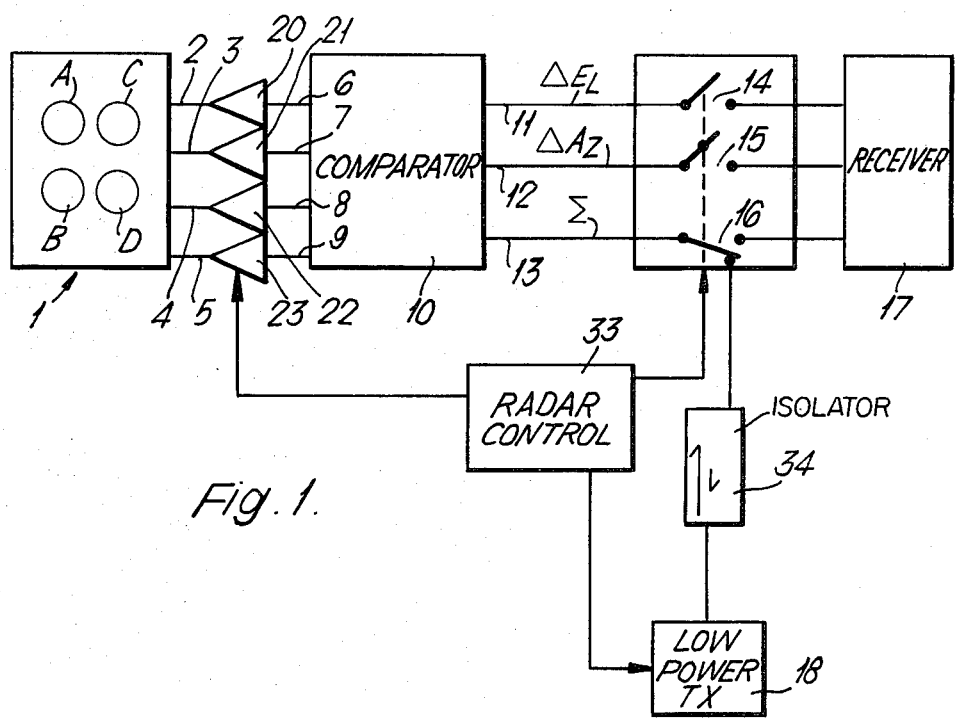
FIG. 1 is a block schematic circuit diagram of an active pulse doppler radar system in accordance with the invention.
Figure 4:
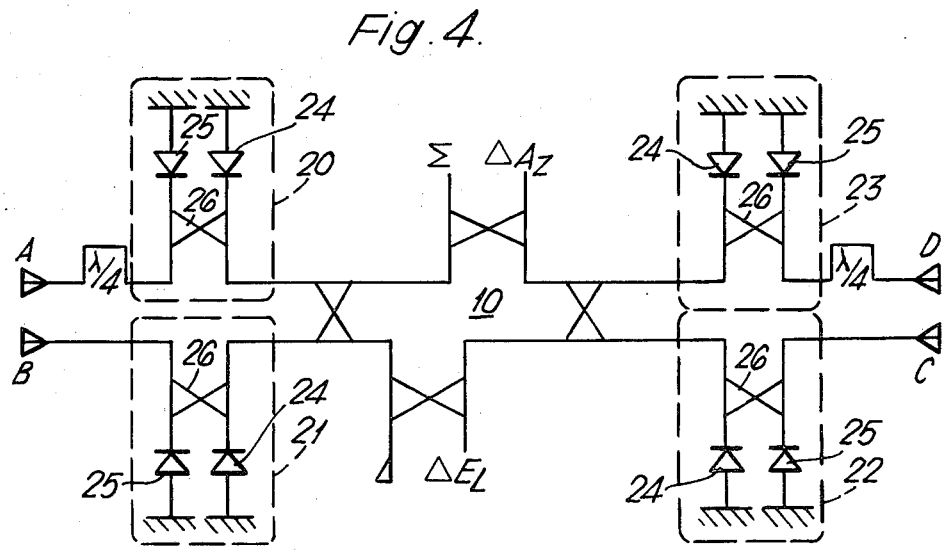
FIG. 4 is a schematic circuit diagram of a preferred form of hybrid network incorporating the channels, the amplifying means and the comparison means shown in FIG. 1.

Referring in the first instance to FIG. 1, the active pulse doppler radar system comprises a multichannel transmit/receive aerial system 1 having four aerial elements A, B, C and D respectively connected by individual channels 2, 3, 4 and 5 to input terminals 6, 7, 8 and 9 of a comparator 10 in known manner. The comparator 10 is arranged to process signals received from the four aerial elements A, B, C and D and to provide an elevation difference signal $\Delta E_L$ at an output terminal 11, an azimuth difference signal $\Delta A_Z$ at an output terminal 12 and a sum signal $\Sigma$ at an output terminal 13. The difference signals $\Delta E_L$ and $\Delta A_Z$ and the sum signal $\Sigma$ are passed by way of respective blanking switches 14, 15 and 16 to a receiver 17.

The blanking switch 16 constitutes a changeover switch and is also arranged to connect a relatively low power transmitter 18 to the output terminal 13 of the comparator 10 so that the individual elements A, B, C and D of the aerial system 1 may consequently be uniformly energised by way of the respective channels 2, 3, 4 and 5. In accordance with the invention each of the channels 2, 3, 4 and 5 incorporates a respective individual amplifier 20, 21, 22 and 23. Each of the amplifiers 20, 21, 22 and 23 is bidirectional and is such that its associated channel 2, 3, 4 and 5 has a net power gain of 10 dB in the "transmit" direction and a negligible loss of not more than 0.5 dB in the "receive" direction.

Figure 2:
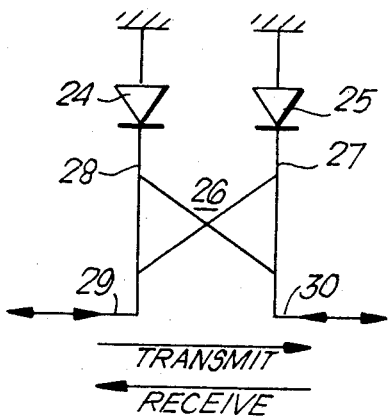
FIG. 2 is a schematic circuit diagram of one of four amplifier means shown in FIG. 1.

As shown in the embodiment of FIG. 2, each of the amplifiers 20–23 comprises a combination of two negative resistance devices, in particular, impact-avalanche-transit-time (Impatt) diodes 24 and 25 terminating a 3 dB quadrature hybrid junction 26. The Impatt diodes 24 and 25 are injection locked oscillators which, at the particular operating frequency act as amplifiers, their power being combined in the hybrid 26. The four amplifiers 20, 21, 22 and 23 are arranged in the circuit configuration shown in FIG. 3 to form the channels 2, 3, 4 and 5, and the comparator 10 is connected to the elements A, B, C and D of the aerial system. This configuration enables the aerial system to combine the transmitted signals of the four elements A, B, C and D in free space, in an effectively lossless manner.

The overall pulsed operation of the system is controlled by control means 33 which makes the various changes at each transition between transmission and reception in known manner. Thus the blanking switches 14, 15 and 16 are controlled, the transmitter 18 is pulsed, and the amplifiers 20-23 have their Impatt diodes suitably biased.

During the periods when the radar system is receiving signals the Impatt diodes are biased off, i.e. constitute open circuits and appear at the arms 27 and 28 of the hybrids 26 as large mismatches at which nearly all the power received at the port 30 is reflected and combined at the input/output port 29. During the periods when the radar system in transmitting the signals applied to the input/output port 29, and incident upon the diodes 24 and 25, are amplified and re-combined at the input/output port 30 of the hybrids 26 with some small losses due to the finite standing wave reflection ratios of the diodes, and the phase or amplitude imbalance in the hybrids 26 giving rise to reflection losses. Thus the amplifiers 20, 21, 22 and 23 act as reciprocal devices giving a net power gain of substantially 10 dB during transmission and a negligible loss of only 0.5 dB during reception.

Figure 3:
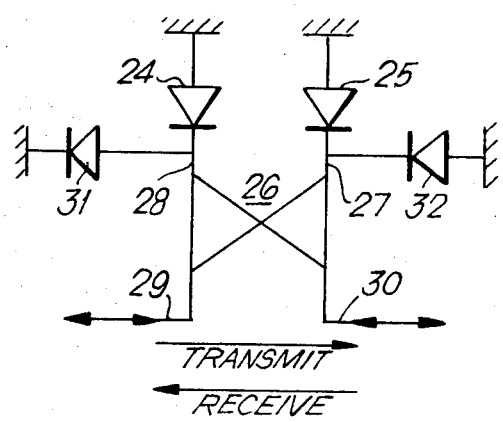
FIG. 3 is a modified arrangement of FIG. 2.

In the modification of FIG. 3, the ports 27 and 28 are each terminated by a parallel combination comprising an Impatt diode 24, 25 and a PIN diode 31, 32. It is a requirement for transmission through the amplifier 20 etc. without substantial losses that the ports 27 and 28 should be terminated by a large mismatch. In FIG. 2 this mismatch is achieved by reverse biasing the Impatt diodes to provide an open circuit. In FIG. 3 the mismatch is provided by the PIN diodes 31, 32 which are forward biased to provide a short circuit. The Impatt diodes still provide an open circuit (if so biased) but, in the presence of a short circuit their condition is irrelevant.

By means of these PIN diodes therefore, the matching requirements for the transmitting and receiving conditions have been separated. Thus, for reception, the mismatch between the ports 27 and 28 can be more easily balanced since it depends only on the PIN diodes, whereas, the Impatt diodes can be selected and set up solely for their performance as amplifiers in the transmitting mode.

Figure 5:
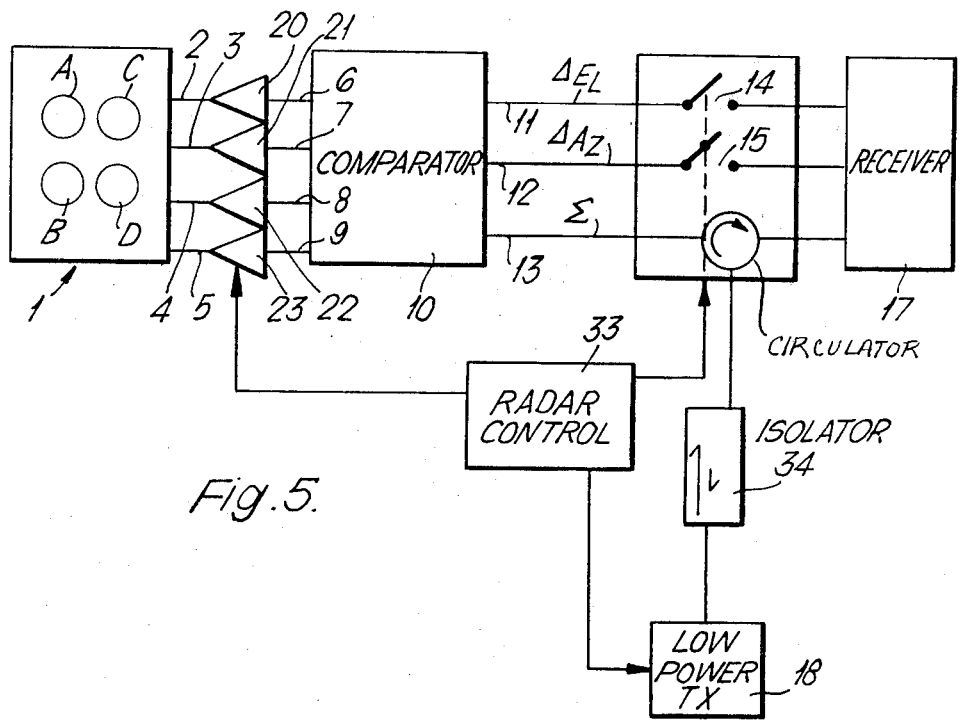
FIG. 5 is a modified form of the radar system of FIG. 1.

A feature of the invention is that, because amplifiers are used in the transmitting channels between the comparator and the aerial a very much less powerful transmitter 18 is required, which is of particular advantage in airborne situations. This also brings the advantage that a solid state blanking switch 16 can be used to isolate the receiver from the transmitter in the transmitting mode. However it is still possible to use a circulator (see FIG. 5) or ring hybrid to ensure that the transmitted signal is coupled to the sum channel only and that the received signal is coupled to the receiver only. Such a circulator will operate at much higher power than the blanking switch but is probably unnecessary in view of the low power transmitter.

Isolation of the transmitter from the received signal is effected by a standard isolator 34.

Although in the embodiment of the invention described above two Impatt diodes are utilized working as injection locked oscillators with their power combined in a hybrid circuit, in other embodiments of the invention each Impatt diode may be replaced by a combination of diodes if higher output power is required.

We claim:

1. A radar system comprising a multi-channel transmit/receiver aerial system, comparator means for providing sum and difference channels for target detection, a low power radar transmitter, means for coupling said radar transmitter into the sum channel, a radar receiver, means for coupling said sum and difference channels to the radar receiver, amplifying means individual to each of the aerial channels, said amplifying means being controllable to provide high gain in the transmitting direction and negligible loss in the receiving direction, and control means for switching said amplifying means, said means for coupling said transmitter, and said means for coupling said receiver, in accordance with pulsed operation of the radar system.

2. A radar system according to claim 1, wherein said amplifying means comprises a hybrid junction having two input/output ports and two further ports terminated by respective negative resistance devices, said negative resistance devices being controllable to provide amplification between said input/output ports in a first bias condition and negligible loss between said input/output ports in a second bias condition.

3. A radar system according to claim 2, wherein said negative resistance devices are IMPATT diodes forward and reverse biased to provide said first and second bias conditions respectively.

4. A radar system according to claim 1, wherein said amplifying means comprises a hybrid junction having two input/output ports and two further ports, each of said further ports being terminated by a parallel combination comprising a negative resistance device controllable to provide amplification between said input/output ports in a first bias condition, said parallel combination also comprising a controllable resistance device having a first bias condition in which it constitutes an open circuit and a second bias condition in which it constitutes a short circuit and causes reflection of power through said hybrid junction from one of said input/output ports to the other with negligible loss, said first and second bias conditions corresponding to radar transmission and reception respectively.

5. A radar system according to claim 4, wherein each said negative resistance device is an IMPATT diode.

6. A radar system according to claim 4 or claim 5, wherein each said controllable resistance device is a PIN diode.

7. A radar system according to claim 1, wherein said means for coupling the radar transmitter into said sum channel comprises a solid state microwave switch whereby the sum channel is connected to the transmitter during radar transmission and to the receiver during radar reception.

8. A radar system according to claim 1, wherein said means for coupling the radar transmitter into said sum channel comprises a microwave circulator whereby the transmitter is coupled to the sum channel only and the sum channel is coupled to the receiver only.

9. A radar system according to claim 1 or claim 7 wherein said means for coupling said sum and difference channels to the radar receiver comprise solid state microwave switches.

* * * * *